Feb. 26, 1935.  A. S. MULLER  1,992,878
DRAINING DEVICE FOR FLOWERPOTS
Filed Sept. 21, 1933
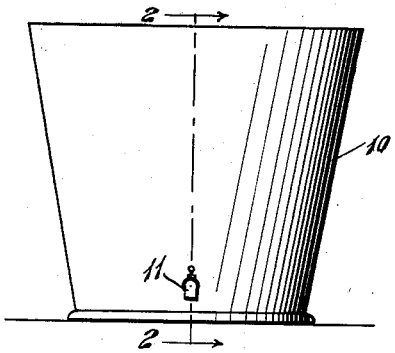
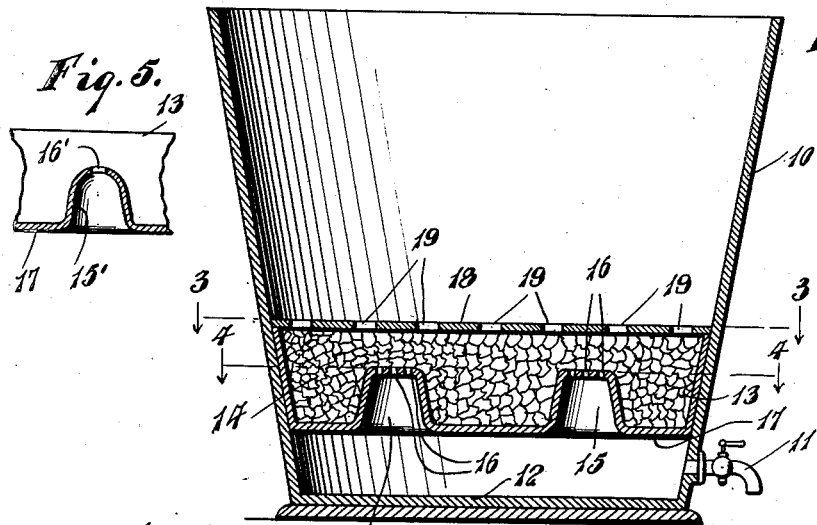
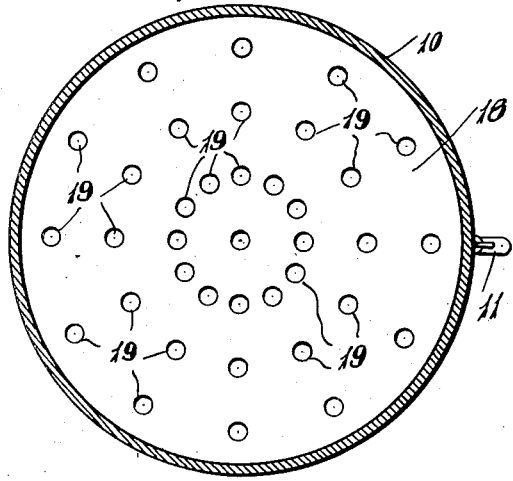
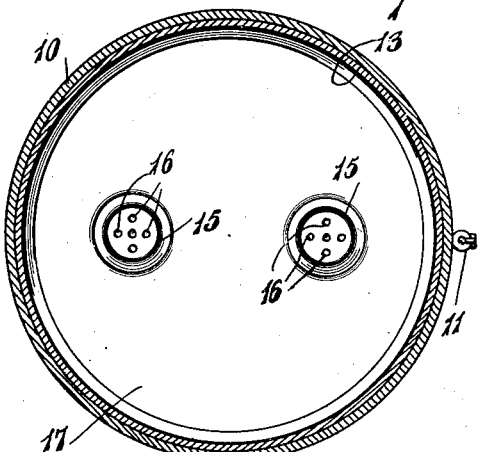
INVENTOR.
A. S. Muller.
BY
ATTORNEY Patented Feb. 26, 1935

1,992,878

UNITED STATES PATENT OFFICE 1,992,878

DRAINING DEVICE FOR FLOWERPOTS

Anthony Severous Muller, Pontiac, Mich.

Application September 21, 1933, Serial No. 690,453

1 Claim. (Cl. 47—38)

The invention relates to means for draining excess water from the earth in flower pots to prevent the earth from becoming sour and losing its fertility, and has for its principal object the provision of a device of the character stated that is reasonable in cost of manufacture and extremely effective in operation.

A further object of the invention is the provision of a draining device for flower pots comprising a receptacle that is removably replaceable in a flower pot to contain an absorbent, with a removable top for the receptacle provided with perforations so that excess water from the earth supported on the cover or top may drain into the receptacle, the receptacle being provided with an overflow spaced above its bottom so as to retain a quantity of water in the receptacle to saturate the material therein and that will serve to moisten the earth in the flower pot.

The invention will be described in detail hereinafter and will be found illustrated in the accompanying drawing, in which Figure 1 is a view in elevation of a flower pot, Figure 2 is a vertical sectional view on a plane indicated by the line 2—2 of Figure 1, Figures 3 and 4 are transverse sectional views on planes indicated by the lines 3—3, and 4—4, respectively, of Figure 2, and Figure 5 is a fragmentary sectional view showing a slightly modified form of drain for the receptacle.

In the drawing similar reference characters are used to designate corresponding parts in all the views.

A flower pot is shown at 10, the form selected for illustration being the usual conical pot, having an inwardly and downwardly sloping circumferential wall, and is provided with a draw-off valve 11 located near its bottom 12.

Spaced above the bottom of the flower pot is a receptacle 13 that is adapted to contain absorbent material, such for instance as charcoal, peat moss, or the like, designated 14. The receptacle 13 has a circumferential wall that intimately engages the sloping circumferential wall of the pot 10, and is provided with drains 15 having overflow openings 16 that are as shown spaced above the bottom 17 of the receptacle so that water entering the receptacle will be retained therein until there is a sufficient quantity to overflow through the openings 16, and thus provide for saturation of the charcoal or other absorbent material 14 in the receptacle, the moisture of the saturated material being taken up by evaporation and capillary attraction by the earth in the pot, and furthermore it will be apparent that the roots of the plant in the pot will find their way into the receptacle to take up the moisture therein.

The receptacle is preferably closed by a lid or cover 18 having a plurality of openings 19, said lid or cover being adapted to support the earth in the pot and the perforations or openings 19 to permit excess water supplied to the earth to drain into the receptacle.

In Figure 5 is shown a modified form of the drain openings, designated 15', having a rounded top in which is provided a single drain opening 16'.

What is claimed is:—

In combination with a flower pot having an inwardly and downwardly sloping circumferential wall, a receptacle mounted in said flower pot having a circumferential wall inclined to intimately engage the inner face of the wall circumferential of the flower pot and spaced above its bottom, absorbent material contained in the receptacle to moisten earth in the flower pot, an overflow for said receptacle spaced above its bottom to retain water in the receptacle to saturate said absorbent material, and a perforated cover for said receptacle seated on the upper edge of the circumferential wall thereof.

ANTHONY SEVEROUS MULLER.